United States Patent Office  
3,763,228  
Patented Oct. 2, 1973

3,763,228  
OXIDATION OF 3-OXO-4-OXA-5β-CHOLESTANE  
George R. Pettit, Paradise Valley, Ariz., and Jerry R. Dias, Santa Clara, Calif., assignors to Research Corporation, New York, N.Y.  
No Drawing. Filed Mar. 16, 1970, Ser. No. 20,141  
Int. Cl. C07c 51/24  
U.S. Cl. 260—514 G                   3 Claims

ABSTRACT OF THE DISCLOSURE

There is provided a novel method of preparing steroids having the cyclopentanophenanthrene nucleus, in particular those possessing the valuable 3-oxo-4-ene groupings, from tetracyclic triterpenes such as lanosterol.

The method comprises converting lanosterol to the corresponding 3β-hydroxy-5α-lanostane which is then subjected to A-ring contraction to give the known 3-oxo-A-nor-14α-methyl cholestane. The five membered "A" ring is converted to the corresponding 3-oxo-4-oxa compound. This lactone is oxidized to the corresponding 3,5-seco-5-oxo-3-oic acid, dehydration leads to ring closure and formation of the Δ⁵ lactone. This Δ⁵ lactone is cleaved by, for example, the action of a Grignard agent to yield the corresponding tricyclic 3,5-dione which is ring closed by the action of a strong base to give the corresponding valuable 3-oxo-4-ene steroid.

The method has great and surprising flexibility in being substantially unaffected by substitution patterns in the B, C or D rings of the nucleus. The method thus presents lanosterol as a cheap and readily available raw material for most known steroids and is thus a desirable alternative to the presently used diosgenin for this purpose.

FIELD OF INVENTION

Novel synthesis of the steroid nucleus.

DESCRIPTION OF THE PRIOR ART

Tetracyclic triterpenes have been converted to the highly desired and valuable 3-oxo-4-ene steroids by the method of Voser et al. (Helv. Chim. Acta, 35, 830 (1950)). The procedures and reagents used, although practical for laboratory scale synthesis are not suitable for industrial conversion of these starting materials to the desired steroids. The particular disadvantage of the Voser technique lies in the use of osmium tetroxide in the formation of the tricyclic 3,5-seco-A-nor-3,5-dione which is the immediate precursor of the desired 3-oxo-4-ene steroid. This reagent is unsuitable for industrial scale synthesis. Barton et al. (J. Chem. Soc., 903 (1954)) attempted to bypass the use of osmium tetroxide. However, they report that the attempt was unsuccessful.

SUMMARY OF THE INVENTION

The invention described herein was made in the course of work under a grant or award from the Department of Health, Education, and Welfare.

There is provided a novel method of converting readily available and cheap tetracyclic source materials such as lanosterol into compounds having the substantially saturated cyclopentanophenanthrene or steroid nucleus, in particular the highly desirable 3-oxo-4-ene steroids.

While the principal embodiment of the present invention comprises the conversion of lanosterol into 3-oxo-14α-methylcholest-4-ene, it is within the purview and intent of the present invention that the C–20 partial side chain, the C–17 side chain or the C–14 methyl group may be or any combination thereof may, if desired, be removed prior to carrying out the principal steps of the present invention and said steps carried out on the corresponding des-alkyl compounds. It is also within the purview and intent of the present invention that, where desired, the aforementioned C–20, C–17 or C–14 substituent groups may be removed after application of the principal operations of the present invention upon the substantially intact tetracyclic triterpene molecule.

The methods of removing these substituent alkyl moieties are well known in the art, as are methods of inserting other substituent groups such as oxo, ethynyl, hydroxy and other substituent moieties into the steroid nucleus. While certain of the moieties may be inserted into the triterpene nucleus, commercial considerations dictate that such insertions be carried out after the basic alkyl substitution pattern of the steroid nucleus has been set, and most desirably after the principal operation subsumed in the process of the present invention have been carried out.

For the sake of completeness of understanding of the scope of the present invention Chart I shows the entire reaction sequence starting with the known 3-hydroxy-5α-lanostane (I), which is derived from crude lanosterol by methods well known in the art, through the highly desired 3-oxo-4-ene steriod (VIII). The process of the present invention, however, is principally concerned with the conversion of a 3-oxo-A-nor-5β-cholestane (III) to the corresponding 3-oxo-4-oxa-cholest-5-ene (VI). The reduction of the corresponding 3-oxo-4-oxa-5β-cholestane (IV) to the corresponding novel 4-oxa-5β-cholestane (IX) is also within the scope of the present invention, 4-oxa-14α-methyl-5β-cholestane is useful as an anti-androgenic agent.

The following discussion of the process of the present invention will discuss the invention solely in terms of the operations carried out on the "A" ring. The final product of the reaction sequence (VIII) may be converted into the corresponding 14-desmethyl compound (X) by, say, the method of Knight et al. (J. Biol. Chem., 241, 1502 (1966)). Oxidative degradation of the C–20 alkyl side chain leads to progesterone (XI) which may in turn be converted into 17-hydroxy progesterone and thence to the corticoids such as hydrocortisone and other well-known and valuable steriods by methods well known in the art. (See Applezweig, Chemical Week, May 17, 1969). These reaction sequences (VIII–XVII) are shown on Chart II.

For example, a tetracyclic triterpene such as lanosterol is converted to the corresponding 3β-hydroxy-4,4-dimethyl-5 steriod (I) such as 3β-hydroxy-5α-lanostane, by the method of Voser et al. (Helv. Chim. Acta, 33, 1893 (1950)) which is then converted into the corresponding 3-isopropylidene-A-nor-5α-steroid (II) such as 3-isopropylidene-A-nor-5-cholestane, by the action of phosphorus pentachloride in a cold, reaction inert solvent such as benzene/toluene or methylene chloride according to the method of Barton et al. (J. Chem. Soc., 903 (1954)). Compound (II) is then ozonized at the low temperatures, suitably at Dry Ice/acetone bath temperatures, followed by reduction, suitably with zinc in glacial acetic acid according to Barton et al. (supra) to yield the corresponding 3-oxo-A-nor-5β compound (III).

In the principal steps of the process of the present invention, a 3-oxo-A-nor-5β-cholestane (III) is treated with a peracid in a reaction inert solvent to yield the corresponding 4-oxa-3-one of the 5β-cholestane series (IV). The lactone (IV) is then treated with Jones reagent (Bowden et al., J. Chem. Soc., 39 (1946)) to yield the corresponding 5-oxo-3,5-seco-A-nor-3-oic acid of the cholestane series (V). This is believed to be the first direct conversion of a lactone to a keto acid. The acid (V) may be isolated, or preferably treated in situ with an enol lactonizing agent such as acetic anhydride/perchloric acid to yield the 3-oxo-4-oxa-5-ene of the cholestone series (VI). The lactone (VI) is subjected to ring cleavage using a Grignard reagent or organometallic compound such as alkyl lithium or alkyl sodium to give the 4,5-seco-3,5-dione of the cholestane series (VII), which is subjected to ring closure under basic conditions yielding the desired 3-oxo-4-ene steriod (VIII).

It should be pointed out that where a methyl Grignard or an alkali metal methyl is used, R' in compound (VIII) is hydrogen. However, where higher alkyls are used R' is the starting alkyl less one carbon, thus ethyl magnesium iodide yields R'=methyl and butyl lithium yields R'=propyl.

While the foregoing description of the process of the present invention refers to compounds of the cholestane series, and these steps are specifically illustrated hereinbelow using 14α-methyl compounds of the cholestane series, it is specifically within the purview and intent of the present invention that these procedures may be carried out using the corresponding members of the pregnane, androstane and estrane series provided any potentially labile groups on rings B, C and D thereof are protected by protecting groups well known to those skilled in the art.

DESCRIPTION OF THE PREFERRED EMBODIMENTS

The A ring of the 3-oxo-A-nor steriod (i.e. compound III) may be converted into the corresponding 3-oxo-4-oxa steroid (i.e. compound IV) by the action of a peracid.

Compound (III) for example 3-oxo-A-nor-14α-methyl-5β-cholestane is suitably taken up in a reaction inert solvent, suitably a hydrocarbon or halogenated hydrocarbon solvent such as benzene, toluene, chlorobenzene, methylene chloride, ethylene chloride and the like and treated with a peracid. It is preferred to use an organic peracid, for example trifluor-peracetic, perphthalic, m-chloroperbenzoic, perbenzoic, peracetic acid and like acids.

There is utilized a slight excess of acid, suitably from 5–15 mol percent, preferably about 10 mol percent of acid per mole of ketone (III). The addition is carried out at moderately low temperatures such as 0°–14° C., preferably at about 10° C., and the mixture allowed to stand at this temperature for from about 12 to about 24 hours suitably for about 18 hours. The mixture is briefly heated to reflux, say for up to five minutes, suitably 1–2 minutes reflux time, cooled and the product isolated. The isolation may conveniently be carried out by extraction with a suitable solvent, such as methylene chloride, chloroform and the like. The extract is washed with mild base such as sodium carbonate, dried, and the solvent evaporated. The residue may be further purified by column chromatography, suitably on silica gel.

The 3-oxo-4-oxo steroid (IV) is then converted into the corresponding 5-oxo-3,5-seco-A-nor-3-oic acid (V) by treatment with Jones' reagent. This acid (V) may be further converted, without isolation to the 3-oxo-4-oxa-5-ene (VI) by means of an enol-lactonizing agent.

In the preferred embodiment of this step the lactone (IV) such as 3-oxo-4-oxa-A-nor-14α-methyl-5β-cholestane is taken up in a suitable reaction inert solvent. Ketonic solvents, such as alkyl ketones, especially acetone are preferred. Glacial acetic acid may be used as well but yields are not as good as in acetone. The solution is then treated with Jones' reagent, a reagent consisting of chromium trioxide together with sulfuric acid and water. Concentrated sulfuric acid is also operative for the step (IV)→(V), however in view of the general applicability of the whole sequence of steps its use is not recommended. There is utilized a small excess of Jones' reagent 0–50% oxygen equivalents excess may be used, preferably about 25% excess per mole of (IV). It is recommended that at least 1 oxygen equivalent per mole of (IV) be used.

The reaction is carried out at ambient temperatures, say from between about 10° to about 30° C., preferably at between about 15° and 20° C. The duration of the reaction is about one to about four hours, preferably about three hours. In the preferred embodiment, half of the total amount of Jones' reagent is added at the start of the reaction and the remainder after about one and a half hours. The reaction is then quenched, an alcohol may be used for this purpose, a lower alkanol being preferred for ease of reaction. Methanol and ethanol are contra-indicated as quenching agents as they are oxidized to give formaldehyde and acetaldehyde respectively, which could be troublesome by-products in large scale synthesis. The quenchnig agent of choice is isopropanol as it is oxidized to give acetone which is readily removed from the system and is indeed totally compatable with it where acetone is the solvent.

An excess of alkanol is added to the yellow solution containing a green precipitate. After stirring for from about 8 to about 24 hours, suitably for about 12 hours the yellow color is discharged, the green precipitate collected by filtration and the filtrate retained. The precipitate is washed with acetone and the combined acetone filtrates evaporated to yield a yellow oil. This yellow oil is the 5-oxo-3,5-seco-3-oic acid (V) which is of sufficient purity to be used in the next stage without further purification. If desired, however, the acid oil may be taken up in ether and purified by the usual methods of basification followed by reacidification well known to those skilled in the art.

The acid (V) is then lactonized by contact with an enol lactonizing agent. Among the agents which have been found useful are acetic anhydride together with perchloric acid, with sodium acetate, with isopropenyl acetate, or isopropenylacetate per se. Acetic anhydride with perchloric acid, preferably dilute perchloric acid of strength between $10^{-2}$ N and $10^{-4}$ N, suitably $10^{-3}$ N is the reagent of choice. A large excess of reagent may be used, the quantity utilized is not critical. The acid (V) is taken up in a suitable reaction inert solvent, alkyl alkanoates such as ethyl acetate are suitable, as are ethers, such as diethylether, or glacial acetic acid.

The enol lactonizing agent is added to the solution of the acid (V) in the solvent. Reaction is extremely rapid. Reaction times of 1–10 minutes are contemplated, about 5 minutes contact time being preferred. The reaction is carried out between −20° and about 25° C., preferably at about 15°–20° C.

The reaction is quenched by shaking with a mild aqueous base, sodium bicarbonate being preferred. The 3-oxo-4-oxa-5-ene (VI) is then isolated, suitably by evaporation of the solvent layer followed by purification, preferably by recrystallization.

The novel lactone (VI) for example 3-oxo-4-oxa-14α-methyl-cholest-5-ene, may be cleaved to the known 4,5-seco-3,5-dione (VII) by an organo metallic compound such as a Grignard reagent or an alkali metal alkyl. Where a methyl magnesium halide or an alkali metal methyl such as lithium methyl or sodium methyl are used, the compound (VII) bears no substituents other than hydrogen at C–4. Where alkyl moieties containing two or more carbon atoms are utilized in these reagents, there is obtained the corresponding 4-R'-4,5-seco-3,5-dione (VII), where the alkyl group R' contains one carbon atom less than the alkyl group in the organo metallic reagent.

The reaction and work up are carried out by means well known to those skilled in the art. Thus as solvents there may be used benzene, ether, tetrahydrofuran, tetrahydropyran, formal (the dimethyl acetal of formaldehyde) or the like, at the temperatures from about −10° C. to about 20° C., preferably between −5° C. and 0° C., most preferably at ice-bath temperatures. The reaction is run for from about 2 to about 4 hours preferably for about 3 hours. While a certain measure of flexibility is available for the aforesaid reaction conditions, the use of exactly 4 equivalents of the organo-metallic reagent is essential. Lesser amounts of the organo metallic reagent provide insufficient reagent for full reaction, while greater amounts reduce the yield by the formation of undesirable starting materials.

The crude dione (VII) for example 3,5-dioxo-4,5-seco-14α-methyl cholestane prepared as above is taken up in a solvent, preferably without further purification and treated with a base to yield the desired 3-oxo-4-ene steroid (VIII). Suitable solvents include polar solvents such as alkanols, suitably lower alkanols of which methanol is preferred.

The base may be a strong base, such as an alkali or an alkali metal alkoxide or an organo metallic compound convertible to either on contact with water or an alkanol, such as alkali metal alkyls. Small amounts of base are sufficient, 0.5–5%, suitably 1–2% by weight based on dione (VII) are sufficient.

The reaction mixture containing the reactants is heated, preferably under reflux for from 1–3 hours, preferably for from 1 to 2 hours.

The mixture is cooled and the product isolated by means well known to those skilled in the art to yield for example 3-oxo-14α-methyl-cholest-4-ene.

The 3-oxo-4-oxa-5β-steroid (IV) may be reduced to the corresponding 3-desoxo compound (IV). The ketone (IV) for example 3 - oxo - 4-oxa-14α-methyl-5β-cholestane, is taken up in a suitable reaction inert solvent, suitably an ethereal solvent such as diethyl ether or tetrahydrofuran, preferably the latter, and treated with a reducing agent, preferably a boron trifluoride/sodium borohydride mixture. There is utilized from 15 to 50 mols, preferably 30 moles of boron trifluoride and from 1 to 4 mols, preferably 2 mols of sodium borohydride per mol of ketone (IV). The addition takes place at low temperatures, say from −20° C. to 10° C., preferably from −5° C. to 0° C. The mixture is agitated for from ½ to about 2 hours, suitably for about 1 hour, and the reaction completed by heating under reflux for about 30 minutes. The mixture is cooled and the reaction quenched by the addition of acid. Mineral acid, say dilute hydrochloric acid may be used. The solution is then extracted and purified in the usual manner to yield, for example 4-oxa-14α-methyl-5β-cholestane.

These 3-oxo-4-R'-14α-methyl-cholest-4-enes (VIII) are useful as anti-androgenic agents.

EXAMPLES

General experimental data

The key starting material, 3β-acetoxy-7,11-dioxoΔ8-5α-lanostane, was obtained from crude lanosterol by treating the acetylated mixture with chromium trioxide and separating by base extraction (10 N KOH), the accompanying 3β - acetoxy-7,11-dioxo-4,4,14α-trimethyl-5α-Δ8(9)-cholenic acid. Jones' reagent was a solution of chromium trioxide (8 N or 2.67 M) and sulfuric acid (aq.) (4 M). Acetic anhydride-perchloric acid reagent was made by adding 0.05 ml. of 72% perchloric to 50 ml. of ethyl acetate, adding 10 ml. of this solution to 30 ml. of ethyl acetate containing 4.8 ml. of acetic anhydride, and diluting to a final volume of 50 ml. The Grignard reagents (approximately 0.5 M) were prepared in ether under a nitrogen atmosphere.

Alumina (Merck acid washed and basic) and silica gel (E. Merck, 0.2–0.5 mm.) were used for column chromatography. Silica gel HF$_{254}$ (E. Merck, A.G. Darmstadt, Germany) was used for preparative thin layer while silica gel HF$_{254}$ spread on microscope slides was used for thin layer chromatograms (TLC) in assessing product purity. The chromatograms were usually developed with benzene-ethyl acetate (5:1)) and visualized with iodine vapor or by charring with 2% ceric sulfate in 2 N sulfuric acid. The preparative thin layer plates were visualized under ultraviolet light. Temperature in degrees C.

EXAMPLE I

3β-acetoxy-7,11-dioxo-5α-lanostane

Zinc dust (140 g.) was added, in small portions, to a well stirred refluxing solution of crude 3β-acetoxy-7,11-dioxo-Δ$^{8,9}$-5α-lanostane (140 g.) in glacial acetic acid (700 ml.). After heating at reflux for 23 hrs., the clear supernatant was decanted from the gray metal-salt sediment into water (4 l.). The white precipitate was filtered and washed well with water. Elution with benzene-petroleum ether (1:1) through a column of alumina (500 g. acid washed grade) after evaporation of the solvent yielded 44 g. of colorless plates of 3β-acetoxy-7,11-dioxo-5α-lanostane: M.P. 219–220°; $\nu_{max.}$ (KBr) 2970, 1730 and 1240 (acetate), and 1690 K.

EXAMPLE 2

3-hydroxy-5α-lanostane

Anhydrous hydrazine was distilled behind a plexiglass barrier from sodium hydroxide pellets into a diethylene glycol solution (425 ml.) containing 3β-acetoxy-7,11-dioxo-5α-lanostane (50 g.). The mixture was heated at reflux for 4 hrs., and then a diethylene glycol solution (225 ml.) containing reacted sodium (13.8 g.) was added to the cooled solution. After refluxing again for 24 hrs. at 170–190° (liq. temp.), the volatile material was distilled (ca. 50 ml.) until the solution temperature reached ca. 235°. The mixture was heated at reflux for another 24 hrs., and finally poured into ice-water (2 l.). The white solid was collected, washed well with water, and dried in vacuo. Recrystallization from methanol - chloroform yielded 31.5 g. of fine colorless needles of 3-hydroxy-5α-lanostane: M.P. 177–8° (lit. M.P. 171–2°); $\nu_{max.}$ (KBr) 3350 (broad), 2970, 1450 (med.), 1375 (med.), and 1040 K (med.).

EXAMPLE 3

3-isopropylidene-14α-methyl-A-nor-5α-cholestane (II)

3β-hydroxy - 5α - lanostane (I) was dissolved (4.8 g.; 0.011 m.) in benzene (700 ml.) and toluene (250 ml.). To the ice-bath chilled mixture was added phosphorus pentachloride (4.8 g. or 0.024 m. dissolved in 80 ml. methylene chloride). After the clear, cold mixture (5–10°) was stirred for 55 mins., saturated aqueous sodium carbonate (50 ml.) and water (200 ml.) was added, and stirring was continued for another ½ hr. The upper organic phase was evaporated to dryness in a strong hood draft overnight. The yellow solid was dissolved in carbon tetrachloride and column chromatographed through alumina (200 g. of Merck grade) elution with petroleum ether, followed by solvent evaporation gave 2.82 g. of white needles of 3-isopropylidene-14α-methyl-A-nor-5α-cholestane; M.P. 110–113°; $\nu_{max.}$ (0.1 M in CHCl$_3$) 2970, 1480 and 1390 K; PMR 130 Hz. (hump, 3 p., C–2 and C–5), 104 and 97 Hz. (broad singlets 3 p. ea., belonging to the isopropylidene CH$_3$'s), 85 (methylene envelope), 56 (s., 19-CH$_3$), 50 (s., 14- and 18-CH$_3$'s), and 46 Hz. (d., J=7 Hz., C–21 and C–26 and C–27).

EXAMPLE 4

3-oxo-14α-methyl-A-nor-5β-cholestane (III)

3 - isopropylidene-14α-methyl-A-nor-5β-cholestane (II) was dissolved (21.2 g.; 0.0513 m.) in chloroform (3.6 l.) and chilled on a Dry Ice-acetone bath (to ca. −65°) while agitating with a stream of oxygen. A slow stream of ozone in oxygen was permitted to pass through the reaction mixture until a deep blue color persisted for 30 mins. The mixture was purged with pure oxygen until the blue color vanished, and then zinc dust (20 g.) and glacial acetic acid was added (800 ml.). After stirring for 2 hrs. the lower chloroform layer was washed with (3 l. in 2 aliquots) and evaporated to dryness in a strong hood draft. The acetic smelling, yellow oil was dissolved in benzene and column chromatographed through alumina (600 g. of acid washed grade). Elution with benzene-petroleum ether (1:4) followed by evaporation of the solvent yielded 10 g. (50%) of a white solid. Recrystallization from ethyl acetate gave 3-oxo-14α-methyl-A-nor-5β-cholestane: M.P. 126.5–127.5° (lath shaped crystals); $\nu_{max}$. (0.1 M in $CHCl_3$) 2970, 1740 (str. C=O stret.), 1475, 1390, and 1240 K; PMR Hz. (m., C–2 and C–5), 80 Hz. (methylene envelope), 72 (s.), 55 (s.), 49 (s.), and 43 Hz. (s.); RD in chloroform, $[\alpha]_{589}$ +126°, $[\alpha]_{500}$ +175°, $[\alpha]_{400}$ +385°, $[\alpha]_{350}$ +740°, $[\alpha]_{314}$ +2430° (peak), $[\alpha]_{306}$ +1900° (shoulder), $[\alpha]_{292}$ 0.00°, $[\alpha]_{275}$ −1330° (trough), $[\alpha]_{250}$ −4670°; mass spec. 231 (100%), M⁺ −15 (1.5%), and M⁺ 386 (9%).

*Analysis.*—Calcd. for $C_{27}H_{46}O$ (percent): C, 83.87; H, 11.99; O, 4.14. Found (percent): C, 83.82; H, 11.75; O, 4.43.

EXAMPLE 5

3-oxo-4-oxa-14α-methyl-5β-cholestane (IV)

3-oxo-14α-methyl-A-nor-5β-cholestane (III) (5.24 g.; 0.0135 m.) was dissolved in methylene chloride (ca. 30 ml.) and there was added pertrifluoroacetic acid (13 ml.) previously made by combining the cold components of 8.47 ml. of trifluoroacetic anhydride, 1.37 ml. of 90% hydrogen peroxide, and 10.5 ml. of methylene chloride. After standing in the refrigerator for 24 hrs. the amber mixture was heated to reflux for 2 min. Chloroform (50 ml.) was added to the cooled mixture and washed with water (300 ml. in 3 aliquots), 1 M sodium carbonate (50 ml.), and saturated aqueous sodium chloride (25 ml.). The solution was evaporated and the residue on column chromatographed through silica gel (100 g.) yielding 4.24 g. (78%) of a white solid upon evaporation of the benzeneethyl acetate (5:1) eluate. Recrystallization from methanol gave white plates of 3-oxo-4-oxa-14α-methyl-5β-cholestane: M.P. 172–7° (plates to needles at 163°); $\nu_{max}$. (0.1 M in $CHCl_3$( 2970, 1730 (str. C=O stret.); PMR 249 (1 p., C–5), 150 Hz. (quartet, 2 p., C–2), 90 (methylene envelope) 62 (s., 19-$CH_3$), 52 (d., J=6 Hz., C–21 and C–26 and C–27), and 49 Hz. (s., 14 and 18-$CH_3$'s); mass spec. M⁺ 402.

*Analysis.*—Calcd. for $C_{27}H_{46}O_2$ (percent): C, 80.54; H, 11.52; O, 7.95. Found (percent): C, 8053; H, 11.78; O, 8.20.

EXAMPLE 6

3-oxo-4-oxa-14α-methyl-cholest-5-ene (VI)

3-oxo-4-oxa-14α-methyl-5β-cholestane (IV) was dissolved (0.42 g.) in aqueous acetone (50 ml. containing 2 ml. of water) and Jones' reagent was added (0.50 ml.). After stirring magnetically for 12 hrs., 2-propanol (5.0 ml.) was added to the yellow solution containing a green precipitate; the yellow color was discharged. The green precipitate was collected by filtration and washed with hot acetone. Evaporation of the combined acetone filtrates yielded 0.45 g. of yellow oil.

The yellow oil was dissolved in ethyl acetate (5 ml.) and acetic anhydride-perchloric acid reagent (50 ml.) was added. After 5 mins. had elapsed, the mixture was extracted with saturated aqueous sodium bicarbonate (50 ml. in 3 aliquots) and evaporated to dryness. Recrystallization of the acetic smelling needles from methanol yielded 0.21 g. (50% overall) of 3-oxo-4-oxa-14α-methyl-cholest-5-ene, M.P. 121.8–123.8°.

EXAMPLE 7

5-oxo-14α-methyl-3,5-seco-A-nor-cholestan-3-oic acid (V)

3-oxo-4-oxa-14α-methyl-5β-cholestane (IV) (0.33 g.; 0.82 mm.) was dissolved in aqueous acetone (50 ml. containing 2 ml. of water) and Jones' reagent was added (0.40 ml.). After magnetically stirring for 12 hrs., 2-propanol (5.0 ml.) was added to the yellow solution containing a green precipitate; the yellow color was discharged. The acetone was concentrated and the green residue was extracted with ether (28 ml. in 4 aliquots). This ethereal solution was extracted with 1.0 N potassium hydroxide (45 ml. in 5 aliquots). To the chilled basic solution of the potassium salt was added concentrated hydrochloric acid (5.0 ml.); there was precipitated 0.32 g. of a white solid. The dried white solid was dissolved in acetone (ca. 5 ml.), and the solid matter was removed. Evaporation of the acetone yielded 0.31 g. (91%) of white needles of M.P. 115–120°. Recrystallization from ether-petroleum ether yield 0.23 g. of white needles of 5-oxo-[14α-methyl-3,5-seco-A-nor-cholestan-3-oic acid, M.P. 121.4–122.8°. The pure product gave the following spectra: $\nu_{max}$. (KBr) 3400 (broad $CO_2$-H stret., wk.), 3100 (broad $CO_2$-H hydrogen bonded stret., med.), 2970, 1710 (broad, str. C=O stret., shoulder at 1650), 1460, 1380, and 1225 K (med. C—O stret.); PMR 643 (s. 1 p., vanished with $D_2O$ shake), 140 (m., 4 p., C–2 and C–5), 85 (methylene envelope), 69 (s., 19-$CH_3$), 53 (d., J=6 Hz., C–21 and C–26 and C–27), and 53 Hz. (s., 14 and 18 $CH_3$'s); RD c 0.521 g./100 ml., $[\alpha]_{589}^{+53°}$, $[\alpha]_{500}^{+77°}$, $[\alpha]_{400}^{+135°}$, $[\alpha]_{350}^{+213°}$, $[\alpha]_{314}^{+380°}$ (peak), $[\alpha]_{290}^{+246°}$, $[\alpha]_{271}^{+146°}$ (trough), $[\alpha]_{250}^{+295°}$; mass spec. 346 (100%), M⁺-18 (38%), M⁺-15 (24%), M⁺ 418 (13%).

*Analysis.*—Calcd. for $C_{27}M_{46}O_3$ (percent): C, 77.46; H, 11.07; O, 11.46. Found (percent): C, 77.54; H, 11.01; O, 11.34.

EXAMPLE 8

3-oxo-4-oxa-14α-methyl-cholest-5-ene (VI)

A solution of 5-oxo-14α-methyl-A-nor-3,5-seco-cholestan-3-oic acid (V) (132 mg.) and acetic anhydride perchloric acid reagent (20 ml.) was allowed to stand at room temperature for 5 mins. Saturated aqueous sodium bicarbonate (20 ml.) was added and the mixture magnetically stirred for 1.5 hrs. The ethyl acetate phase was separated and evaporated to dryness. There remained 131 mg. of yellow needles which were dissolved in ethyl acetate and filtered through a filtering aid (Celite). Recrystallization from methanol yielded 74 mg. of white needles of 3-oxo-4-oxa-14α-methyl-cholest-5-ene M.P. 124.2–125.2°. Preparative thin layer yielded a further 19 mg. of this mixture (total yield 74%).

EXAMPLE 9

3-oxo-14α-methyl-cholest-4-ene (VIII)

3-oxo-4-oxa-14α-methyl-cholest-5-ene (VI) (250 mg.) was dissolved in benzene (10 ml.) and ether (10 ml.) and chilled on a salt-ice bath. A clear solution of methylmagnesium iodide in ether was slowly added to the stirring reaction mixture under nitrogen. The progress of the reaction was monitored by thin layer chromatography. After 3 hrs. the chromatogram displayed a barely detectable higher $R_f$ spot of starting enol-lactone (XI) and an intense lower $R_f$ spot assignable to the desired product. Hydrochloric acid (5 ml.), and then ether (10 ml.) was added. The separated ethereal phase was washed with saturated aqueous sodium bicarbonate (10 ml.), aqueous sodium thiosulfate solution, water, and saturated aqueous sodium chloride, and concentrated. The white solid residue thus obtained was dissolved in methanol (20 ml.); 10% aqueous sodium hydroxide solution (2.0 ml.) was added and the mixture heated on a steam bath for 1.5 hrs. The methanolic solution was poured into a mixture of water (40 ml.) and saturated aqueous sodium chloride (40 ml.), the aqueous suspension was then extracted with ether (50 ml. in 3 aliquots). Evaporation of the ether gave a yellow solid which upon preparative thin layer chromatography with benzene-ethyl acetate (5:1) yielded 145 mg. (58%) of white plates of 3-oxo-14α-methyl-cholest-4-ene: M.P. 113.5–115.0°; $\nu_{max}$. (0.1 M in $CHCl_3$) 2960, 1670 (conjugated C=O), 1620 (med. C=C stret.), 1470, 1390, 1240 and 800 K; PMR 344 (s., 1 p., C-4), 140 (m., 4 p., C-2 and C-6), 90 (methylene envelope), 74 (s.), 53 (d., J=6 Hz., C-21 and C-26 and C-27) and 52 Hz. (s., 14 and 18-CH$_3$'s); $\lambda_{max.}^{(EtOH)}$ 242 (log ε 4.19); mass spec. M+ −15 (34%) and M+ 398 (100%).

*Analysis.*—Calcd. for C$_{28}$H$_{46}$O (percent): C, 84.35; H, 11.63; O, 4.02. Found (percent): C, 84.19; H, 11.83; O, 3.98.

EXAMPLE 10

3-oxo-4,14α-dimethyl-cholest-4-ene

An ethylmagnesium bromide solution was slowly added to a solution of 3 - oxo-4-oxa-14α-methyl-cholest-5-ene (140 mg.) in benzene (5 ml.) and ether (5 ml.) on a salt-ice bath while stirring under nitrogen, the reaction was monitored by thin layer chromatography. After a period of 1.5 hrs., the higher R$_f$ spot of starting enol-lactone (XI) had almost completely vanished and a lower R$_f$ spot assignable to the desired product had become quite intense. Hydrochloric acid (5 ml.) was added and allowed to stand at room temperature overnight. The ethereal layer was separated and evaporated in a strong hood draft. Methanol (10 ml.) and 10% aqueous sodium hydroxide (1 ml.) was added to the white solid thus obtained and the mixture heated on a steam bath for 2 hrs. The reaction mixture was diluted with water (40 ml.) and extracted with ether (40 ml. in 4 aliquots). This ether extract was washed with aqueous saturated sodium chloride solution, and the ethereal solution was percolated through anhydrous sodium sulfate. Evaporation of the ether yielded a white solid which, when subjected preparative thin layer using benzene-ethyl acetate (5:1) as the mobile phase yielded 94 mg. (65%) of white prisms of 3-oxo-4-oxa-14α-dimethyl-cholest - 4 - ene upon elution of the higher R$_f$ zone with ether: M.P. 120.5–124.0°; $\nu_{max.}$ (KBr) 2970, 1660 (conjugated C=O stret.), 1600 (wk. C=C stret.), 1460, 1370 and 1300 K; PMR 150 (m., 4 p., C-2 and C-6), 107 (s., 3 p., C-4 methyl), 90 (methylene envelope), 73 (s., 19-CH$_3$), 53 (d., J=6 Hz., C-21 and C-26 and C-27), 52 Hz. (s., 14 and 18-CH$_3$'s); (100%) (Beynon calcd. mass. 412.3705) and M+ −15 (100%) Beynon calcd. mass. 412.3705) and M+ −15 (35%).

*Analysis.*—Calcd. for C$_{29}$H$_{48}$O (percent): C, 84.40; H, 11.72; O, 3.88. Found (percent): C, 84.37; H, 11.60; O, 4.03.

EXAMPLE 11

4-oxa-14α-methyl-5β-cholestane (IX)

3-oxo-4-oxa-14α-methyl-5β-cholestane (IV) (201 mg.) was taken up in tetrahydrofuran (2 ml.) and treated with a mixture of sodium borohydride (90 mg.) and boron trifluoride (2 ml.) at ice bath temperature. The mixture was stirred at this temperature for one hour followed by heating under reflux for 30 mins. The reaction was quenched by addition of 3 N hydrochloric acid (5 ml.), followed by extraction with chloroform. The extract was evaporated to dryness to yield 4-oxa-14α-methyl-5β-cholestane (IX) (75% yield) M.P. 55–57° C., M+ 388, PMR 215 Hz. (2H, C-3), 158 Hz. (C-25), 125 Hz. (methylene envelope), 85 Hz., 79 Hz. (C-19), and 48 Hz. (C-18 methyl).

*Analysis.*—Calcd. for C$_{27}$H$_{48}$O (percent): C, 83.44; H, 12.45; O, 4.12. Found (percent): C, 83.22; H, 12.02; O, 4.76.

What is claimed is:

1. A process for preparing 5-oxo-3,5-seco-A-nor-cholestan-3-oic acid which comprises treating the corresponding 3-oic-4-oxa-5β-cholestane with chromium trioxide in the presence of sulfuric acid and water.

2. A process according to claim 1, for preparing 5-oxo-3,5-seco-A-nor-cholestan-3-oic acid by treating the corresponding 3-oxo-4-oxa-5β-cholestane with chromium trioxide in the presence of a solvent, sulfuric acid and water.

3. A process according to claim 2, for preparing 5-oxo-3,5-seco-A-nor-14α-methyl cholestan-3-oic acid which comprises treating an acetone solution of 3-oxo-4-oxa-14α-methyl-5β-cholestane with chromium trioxide in the presence of sulfuric acid and water.

References Cited

Fieser et al.: Reagents for Organic Synthesis, pp. 142–4 (1967).

Fujimoto et al.: J. Org. Chem. 29, 3377 (1964).

Glotter et al.: J. Chem. Soc., (c) 1646 (1968).

LORRAINE A. WEINBERGER, Primary Examiner

R. GERSTL, Assistant Examiner

U.S. Cl. X.R.

260—343.2, 345.2, 397.2, 586 H, 666 PY

UNITED STATES PATENT OFFICE
CERTIFICATE OF CORRECTION

Patent No. 3,763,228      Dated October 2, 1973

Inventor(s) George R. Pettit and Jerry R. Dias

It is certified that error appears in the above-identified patent and that said Letters Patent are hereby corrected as shown below:

Column 10, Claim 1, line 3, delete 3-oic-4-oxa-5 -cholestane, and insert --3-oxo-4-oxa-5 - cholestane--.

Signed and Sealed this sixteenth Day of December 1975

[SEAL]

Attest:

RUTH C. MASON
*Attesting Officer*

C. MARSHALL DANN
*Commissioner of Patents and Trademarks*